(12) United States Patent
Dubac et al.

(10) Patent No.: US 6,713,988 B2
(45) Date of Patent: Mar. 30, 2004

(54) SELECTIVELY ACTIVATED ELECTROCHEMICAL CELL SYSTEM

(75) Inventors: Donald Dubac, Briarcliff Manor, NY (US); Michael Glover, Walden, NY (US); Haresh P. Kameth, Cape Girardeau, MO (US)

(73) Assignee: eVionyx, Inc., Hawthorne, NY (US)

( * ) Notice: Subject to any disclaimer, the term of this patent is extended or adjusted under 35 U.S.C. 154(b) by 78 days.

(21) Appl. No.: 10/045,896

(22) Filed: Oct. 19, 2001

(65) Prior Publication Data

US 2003/0015992 A1 Jan. 23, 2003

Related U.S. Application Data

(60) Provisional application No. 60/306,769, filed on Jul. 20, 2001.

(51) Int. Cl.$^7$ ................................................. H02J 7/00
(52) U.S. Cl. .............................. 320/121; 320/124
(58) Field of Search ............................ 320/120, 121, 320/122, 124; 307/80, 43, 48

(56) References Cited

U.S. PATENT DOCUMENTS

| | | | | |
|---|---|---|---|---|
| 3,987,352 A | * | 10/1976 | Hirota | 320/101 |
| 4,056,764 A | * | 11/1977 | Endo et al. | 320/101 |
| 4,066,936 A | * | 1/1978 | Hirota | 318/139 |
| 4,649,468 A | * | 3/1987 | Cubbison, Jr. | 363/62 |
| 5,744,936 A | * | 4/1998 | Kawakami | 320/120 |
| 5,793,187 A | * | 8/1998 | DeBauche | 320/121 |
| 6,034,506 A | * | 3/2000 | Hall | 320/117 |
| 6,157,167 A | * | 12/2000 | Schwartz et al. | 320/122 |
| 6,222,284 B1 | * | 4/2001 | Hammond et al. | 307/125 |
| 6,465,986 B1 | * | 10/2002 | Haba | 320/116 |

* cited by examiner

Primary Examiner—Gregory J. Toatley, Jr.
(74) Attorney, Agent, or Firm—Ralph J. Crispino

(57) ABSTRACT

A power generating system is described including a plurality of electrochemical cells. The cells are generally arranged in sections that are selectively activated individually or in combination to produce power from selected cell sections. A method of generating power is also described. A first group of one or more electrochemical cells of an array of cells are selectively activated based on requirement of an associated load. The system switches to a second group of one or more electrochemical cells of the array when the first group is discharged.

11 Claims, 7 Drawing Sheets

SELECTIVELY ACTIVATED ELECTROCHEMICAL CELL SYSTEM

RELATED APPLICATIONS

The present application claims the benefit of U.S. Provisional Application Ser. No. 60/306,769 entitled "Selectively Activated Electrochemical Cell System" filed on Jul. 20, 2001.

BACKGROUND OF THE INVENTION

1. Field of the Invention

The present invention relates to a selectively activated electrochemical cell system, and more particularly to such a system wherein individual cells or groups of cells may be activated in various successions depending on energy and power requirements.

2. Description of the Prior Art

A variety of systems use electrochemical cells such as batteries and fuel cells to meet power needs. For example, many portable devices, backup systems, vehicles, and other power consuming systems use electrochemical cells A key requirement for an electrochemical cell system is to meet the power requirements. Another concern relates to the energy of the cell, which is the length of time that the required power may be provided to the load. Heretofore, it has been extremely difficult to combine high power and high energy A further problem associated with electrochemical cell systems, particularly primary batteries, is that once a battery is activated, it remains active until it is discharged by utilization of the useful energy in the battery, self discharge, corrosion, or combinations thereof. Therefore, interruptibility of conventional batteries, in many circumstances, is limited.

It would be desirable to provide a system that can produce high power and high energy, while further allowing for interruptibility, and therefore extending the useful lifetime of the system.

SUMMARY OF THE INVENTION

The above-discussed and other problems and deficiencies of the prior art are overcome or alleviated by the several methods and apparatus of the present invention, wherein a power generating system is described including a plurality of electrochemical cells. The cells are generally arranged in sections that are selectively activated individually or in combination to produce power from selected cell sections. A method of generating power is also described. A first group of one or more electrochemical cells of an array of cells are selectively activated based on requirement of an associated load. The system switches to a second group of one or more electrochemical cells of the array when the first group is discharged.

The above-discussed and other features and advantages of the present invention will be appreciated and understood by those skilled in the art from the following detailed description and drawings.

DETAILED DESCRIPTION OF THE ILLUSTRATIVE EMBODIMENTS

Figure 1A:
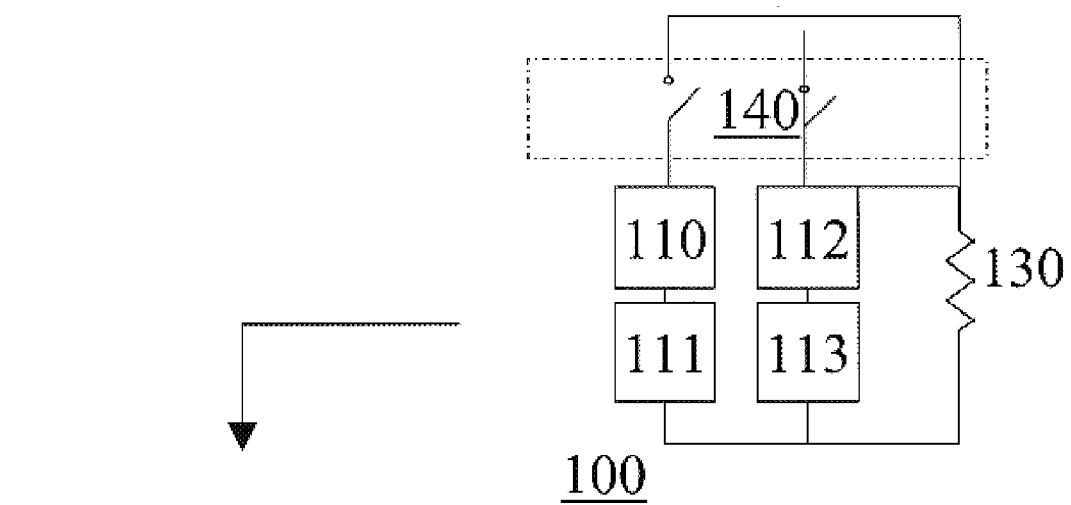
FIGS. 1A–1C is a schematic depiction of one embodiment of a selectively activated electrochemical cell system in operation.
Figure 1B:
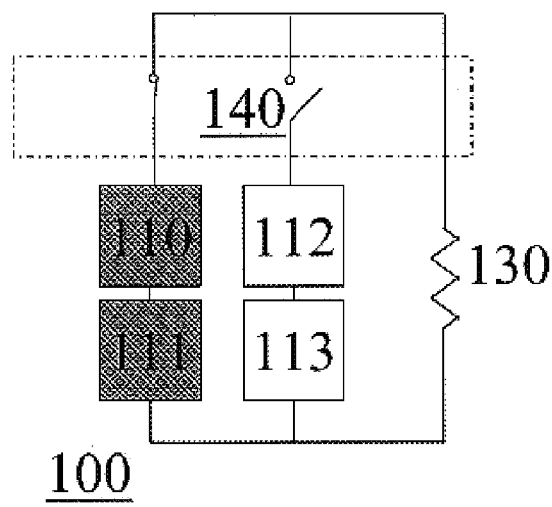
Figure 1C:
Figure 1C:
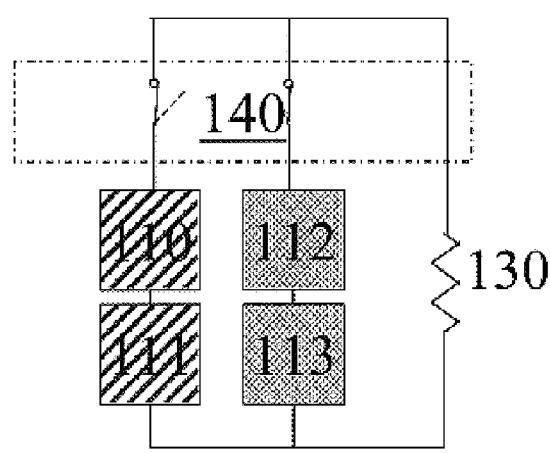

Referring now to FIGS. 1A–1C, a selectively activated electrochemical cell system 100 is schematically depicted in operation. The system 100 is selectively coupled to an electrical load 130. The system 100 comprises a plurality of electrochemical cells 110–113 arranged in a pair of strings (cells 110 and 111 in series, and cells 112 and 113 in series). A controller 140 is provided to selectively activate one or more of the strings. Note that the controller 140 may comprise a computer operably coupled to switches associated with each cell or a group of cells, a manually operated control coupled to switches associated with each cell or a group of cells (which are switched by a user as needed), or a combination thereof.

The type of battery may be primary or secondary (i.e., rechargeable), or a combination of primary and secondary batteries. The cells 110–113 may be the same or different. Types of batteries include, but are not limited to, alkaline, lead-acid, nickel cadmium, metal air, lithium polymer, nickel metal hydride, nickel zinc, magnesium zinc, any combination comprising at least one of the foregoing, and the like. One or more of the cells may also be fuel cells, such as hydrogen based fuel cells such as proton exchange membrane fuel cells or solid oxide fuel cells, metal air fuel cells, any combination comprising at least one of the foregoing, and the like.

During operation, the power demands of load 130 are met by one or both strings of cells 110, 111 or cells 112, 113. The number of the strings selected is controlled by the controller 140. For example, if the power requirement for the load 130 is 100 W, and each of the cells 110–113 are capable of producing 50 W, the controller 140 may activate only the string of cells 110, 111 to power the load 130. If the power demand continues beyond the capacity of the selected cell string, the controller 140 may deactivate the cell string 110, 111 and activate another fresh cell string (e.g., cells 112, 113).

By individually activating strings of cells, particularly in primary battery systems, the limitations related to lack of interruptability are overcome. That is, by using one string of cells to power the load 130, the remaining string (or strings, as the system may provide) are left with the full power and capacity, and discharging of such remaining cells is not initiated, even if the energy is provided from the string of cells 110, 111 to the load 130 is insufficient to discharge such string. Accordingly, if the system is interrupted, only cells 110, 111 will be subject to detriments associated with discharge interruption (e.g., self discharge), unlike conventional battery systems that are not discrete and separately activatable.

In another example, if the load 130 requires 200 W for operation, the controller 140 may activate both the string of cells 110, 111 and the string of cells 112, 113. As shown in FIGS. 1A–1C, the strings are in parallel, however, it is understood that they may be in series, or switchable between series and parallel, depending on the load requirements.

In a further example, if the load 130 initially requires 100 W for operation, the controller 140 will activate the string of cells 110, 111. If the demand subsequently rises to 200 W, the controller 140 will activate the string of cells 112, 113 to power the load 130. By appropriate control, the depth of discharge and the energy utilized from each cell can be maximized.

When one or more of the cells 110–113, or cell strings 110, 111 and 112, 113, are discharged, they may be replaced (individually or in strings) by the user (e.g., manually) or with an automated system. The one or more cells are preferably replaced without interruption of the power output of the system (that is, if the load 130 is in continuing demand for power from the system 100).

Referring particularly to FIG. 1A, both cell strings 110, 111 and 112, 113 are inactive (note the switches are open and the cells are not shaded). To commence power to the load 130, where the single string of cells 110, 111 is sufficient, the string of cells 110, 111 is activated, as shown in FIG. 1B (wherein the associated switch is closed, and cells 110, 111 are shaded). In the event that additional power is required, or if cells 110, 111 are drained (e.g., below a predetermined voltage level), the string of cells 112, 113 may be activated, as shown in FIG. 1C (wherein the switch for cells 110, 111 may remain closed, or be opened (as indicated by dashed lines), and wherein drained cells are indicated with diagonal stripes). Note that the cells 110, 111 may remain in parallel to drain any remaining power therefrom.

The controller 140 may be a computer that is operably coupled to switches to selectively activate one or more of the strings of cells 110, 111 or 112, 113. The controller 140 may monitor the needs of the load 130 to selectively activate one or more of the strings of cells 110, 111 or 112, 113. Alternatively, the system 100 including a computer-based controller 140 may be manually operated. The controller 140 can monitor the load requirement, such that a determination is made as to how many of the strings of cells 110, 111 or 112, 113 to activate, and in what configuration (i.e., parallel, series, or a combination thereof), if applicable. Switching between the cells may be based on a timer, such that once activation commences, the controller 140 will switch to another cell after a certain period of time. The time may be a constant for the particular cell or type of cell, or may vary based on monitoring of the load 130. Alternatively, the switching may be based on the status of the selectively activated string(s), which can be monitored by the controller 140. The status may be monitored by various sub-systems, including but not limited to: monitoring the real-time power output of the selectively activated cell(s), wherein the cell(s) will be switched when the remaining calculated energy or the voltage drops below a preselected level; or monitoring the chemical characteristics the cell(s) (e.g., by monitoring the expansion of the cell, which (in metal air cells) may be related to the chemical properties since the metal is converted to a higher volume metal oxide material; or by monitoring the composition of the electrolyte).

The controller 140 may also provide other features, including, but not limited to: monitoring the status of the cells including non-active cells (individually or in groups), monitoring the temperature of the system 100; providing cooling when needed (wherein a cooling sub-system is also provided in the system 100); automatically ejecting structures containing one or more of the cells when discharged to facilitate replacement thereof (wherein an ejection sub-system is also provided in the system 100); providing safety features, such as indicators, self-deactivation, and self-extinguishing (e.g., in the event of fire, wherein an extinguishing sub-system is also provided in the system 100); or any combination comprising at least one of the foregoing. The power output of the system 100 may also be conditioned or converted, for example, from DC to AC, or from DC to DC (at different voltages), as is known in the power supply art. The system and/or loads may also be protected with one or more circuit breakers or fuses.

Power for the controller 140 and any included sub-systems may be derived from one of the cells in the system 100. Where a rechargeable cell is provided, it is preferred to power the controller with said rechargeable cell. Alternatively, a suitable capacity rechargeable cell can be provided that is dedicated to the controller.

In another embodiment, a system may be provided wherein each cell is activated by incorporation of electrolyte in the cell. When electrolyte is added from a separate source, such as a bladder, syringe, tank, etc., the cell is activated. Thus, virtually infinite shelf life may be attained for the inactivated cells. For example, a system maintaining electrolyte out of contact with active cell components is described in U.S. Provisional Application Serial No. 60/309,730 entitled "Reserve Battery" filed on Aug. 2, 2001 by Nicholas Pasquale.

Referring now to FIGS. 2A–2H, another embodiment of a selectively activated electrochemical cell system and various modes of operation thereof are depicted. A selectively activated electrochemical cell system 200 includes a plurality of cell strings 210, 212, 214, 216 and 218. Note that any number of strings, or cells within each string, may be incorporated in the system, depending on the particular needs.

In the system 200, string 218 is a string of relatively high power producing cells with relatively low energy capacity (as compared to strings 210, 212, 214 and 216), and strings 210, 212, 214 and 216 are strings of relatively high energy capacity cells with relatively low power output (as compared to string 218). For example, string 218 may comprise a string of secondary batteries (e.g., rechargeable lead-acid or nickel cadmium), and the strings 210, 212, 214 and 216 may comprise primary batteries (e.g., alkaline cells or metal air cells). This system, a hybrid system, is particularly useful for meeting demands of load 230 when the power requirement increases, as in a spike, induction, inrush, start-up, or other transient load characteristic.

For example, consider an environment wherein the system 200 is utilized as a backup power system, and that the load 230 typically operates at less than 100 W, and occasionally increases to 300 W. Further, consider the example where string 218 comprises a high power (300 W), low energy (50 W-H) lead-acid battery, and strings 210, 212, 214 and 216 comprise high energy (500 W-H), low power (100

W) zinc-air batteries, that may be replaced or refueled (e.g., by replacing the zinc in the batteries). String 218 is intended to handle up to 300 W peaks of the load 230. Strings 210, 212, 214 and 216 may be used for lower power requirements. In one example, string 218 may be connected to the load 230 via a diode that only becomes forward biased when the current demand of the load 230 is sufficient to cause a voltage drop within one of the selected strings 210, 212, 214 and 216 corresponding to a 100 W load (e.g., the maximum of each of each of strings 210, 212, 214 and 216). Further, for low power uses, the string 218 may handle the load 230 for the first few minutes of operation of system 200, or when it is known that the system 200 will be operational for only a few minutes. In this manner, one or more of the strings 210, 212, 214 and 216 are not activated until string 218 is discharged. With certain types of cells, once a cell is activated, it will remain active until it is discharged either by extracting the useful energy or by self-discharge. Therefore, by activating only certain strings, the power reserve (i.e., within the inactivated strings) remains intact.

Figure 2A:
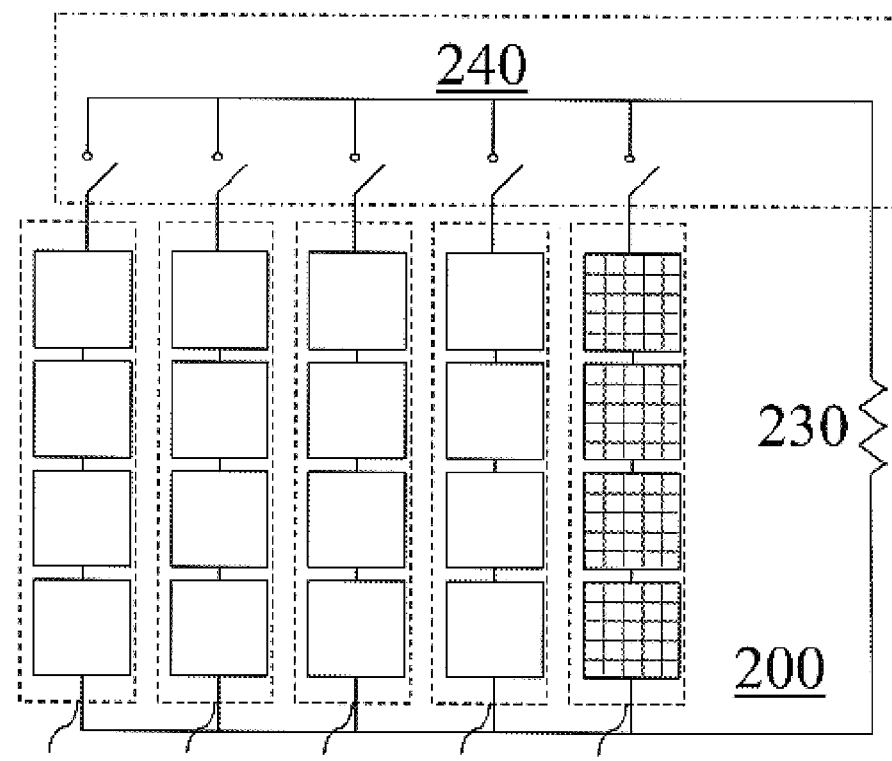
FIG. 2A is a schematic depiction of another embodiment of a selectively activated electrochemical cell system having activation switches open.
Figure 2B:
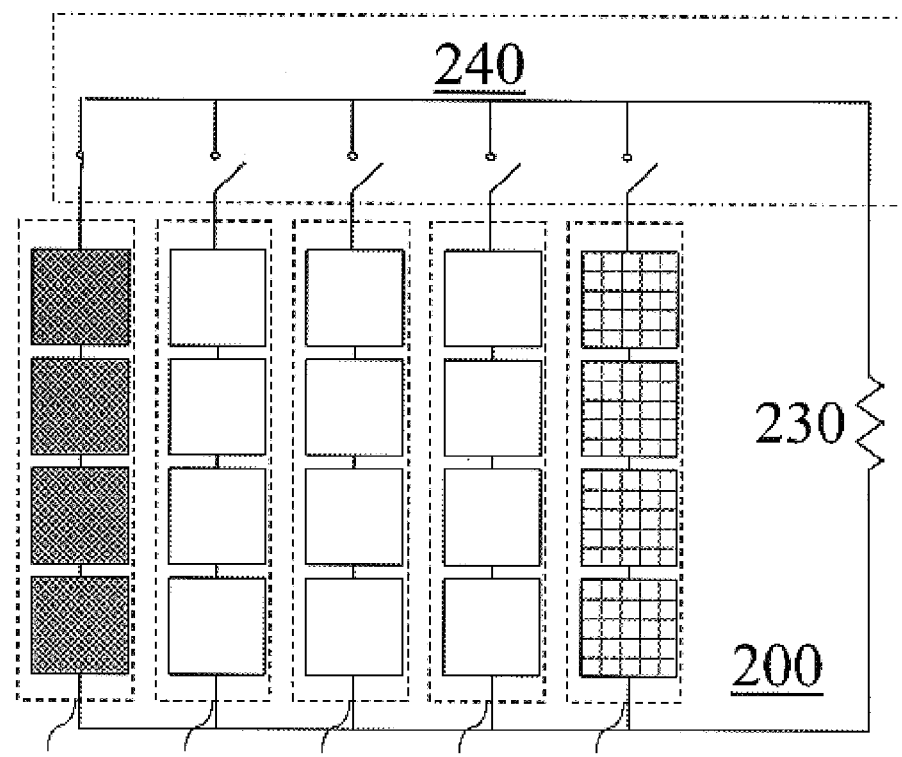
FIG. 2B depicts the system of FIG. 2A in a mode of operation utilizing a section of a first type of cells.

In the mode of operation depicted in FIG. 2B, the switch associated with string 210 is closed, thus string 210 is providing power to load 230. As discussed above, this situation is intended for load demands below the maximum power of the string 210. Further, use of the string 210 is preferably for a time period sufficient to utilize capacity with the string 210, so as to minimize wasted power (particularly wherein the nature of the cells within the string 210 are such that self discharge is a concern).

Figure 2C:
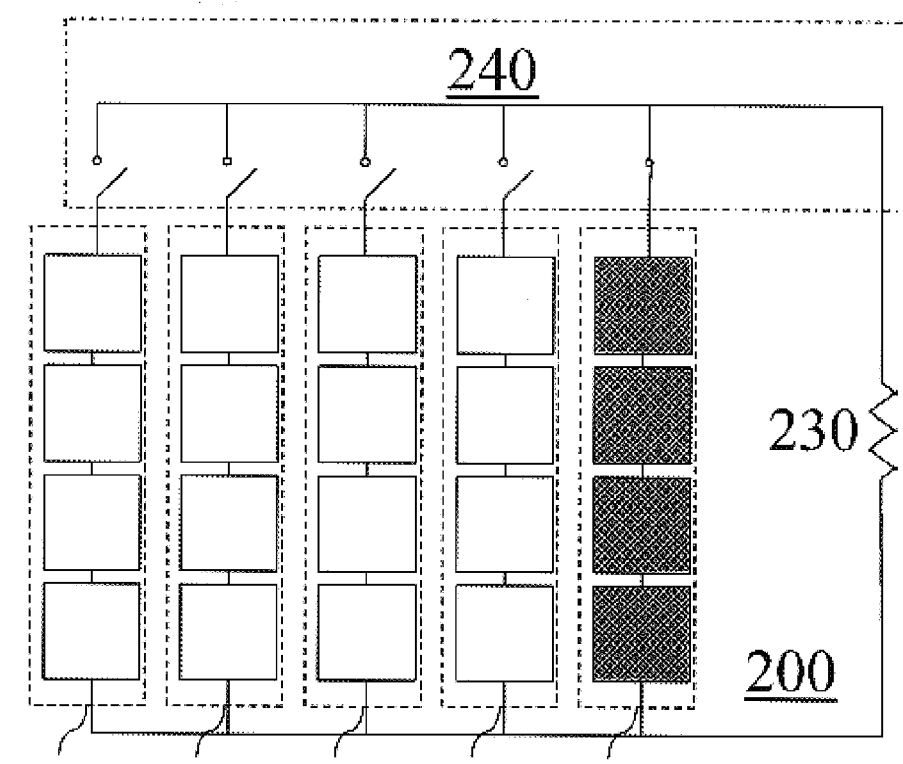
FIG. 2C depicts the system of FIG. 2A in a mode of operation utilizing a section of a second type of cells.

In the mode of operation depicted in FIG. 2C, the switch associated with string 218 is closed, thus string 218 is providing power to load 230. As discussed above, this situation is intended for load demands above the maximum power capabilities of the string 210. The string 218 is preferably activated below a time period that would otherwise completely drain the cells therein. Thus, in various preferred embodiments, the control approximates the upcoming needs of the system 200, and causes utilization of string 218 for, e.g., transients or short term needs.

Figure 2D:
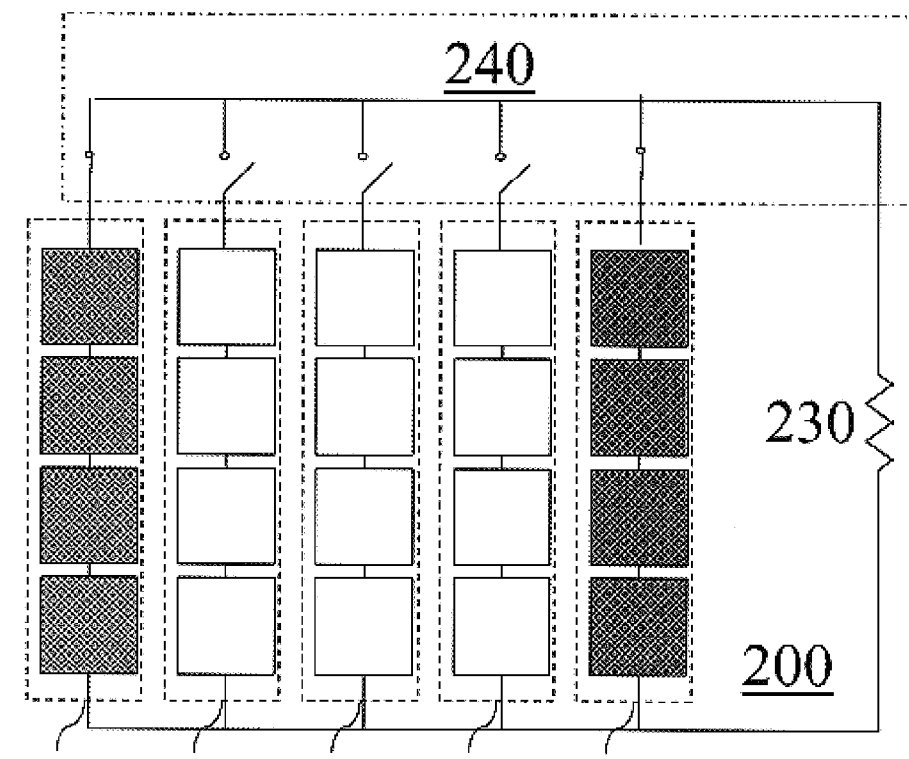
FIG. 2D depicts the system of FIG. 2A in a mode of operation utilizing sections of both a first type and a second type of cells.

In the mode of operation depicted in FIG. 2D, the switches associated with string 218 and string 210 are closed. In one embodiment, depending on associated control (not shown), string 218 may provide power to load 230, whereas string 210 provides recharging current for string 218. In another embodiment, string 210 may provide power to both meet the needs of load 230 and recharge string 218. In still a further embodiment, strings 210 and 218, in parallel, may provide power for the load 230, e.g., during a high current transient condition.

Figure 2E:
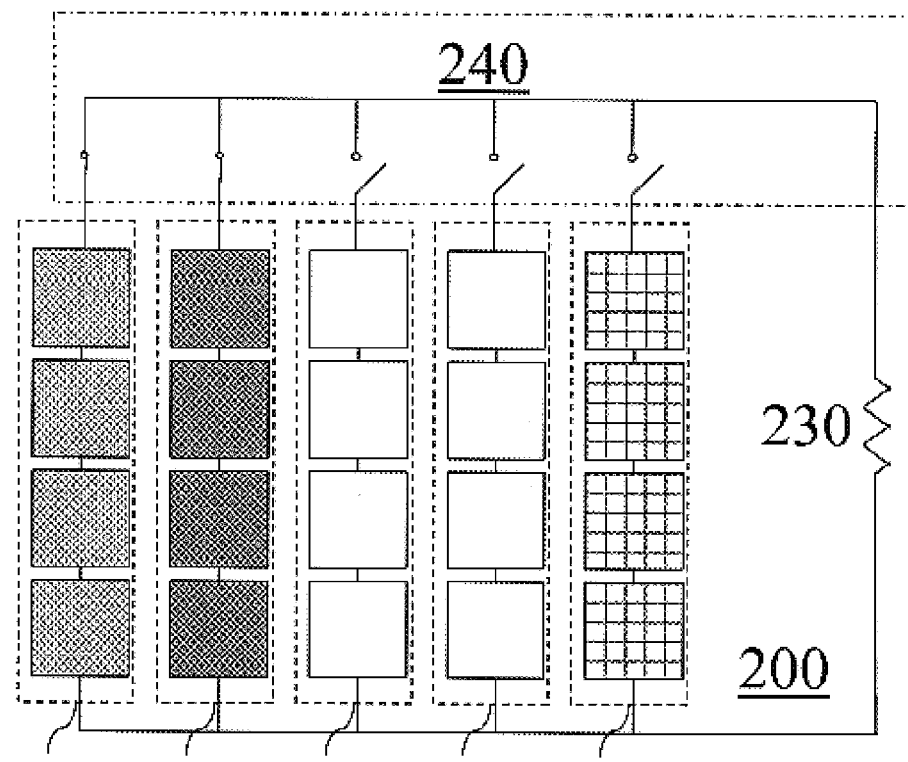
FIG. 2E depicts the system of FIG. 2A in a mode of operation showing one section of a first type of cells partially discharged and further utilizing another section of a first type of cells.

In the mode of operation depicted in FIG. 2E, the switches associated with strings 210 and 212 are closed. In this embodiment, as depicted by the shading variations in the Figure, string 210 has been in operation for some time when string 212 is initiated. For instance, this may be useful when the current demand for the load 230 increases to a higher level for a period of time, and the capacity of the string 218 is insufficient. Further, this mode may be useful to compensate for any voltage drop in the string 210 after a period of operation.

Figure 2F:
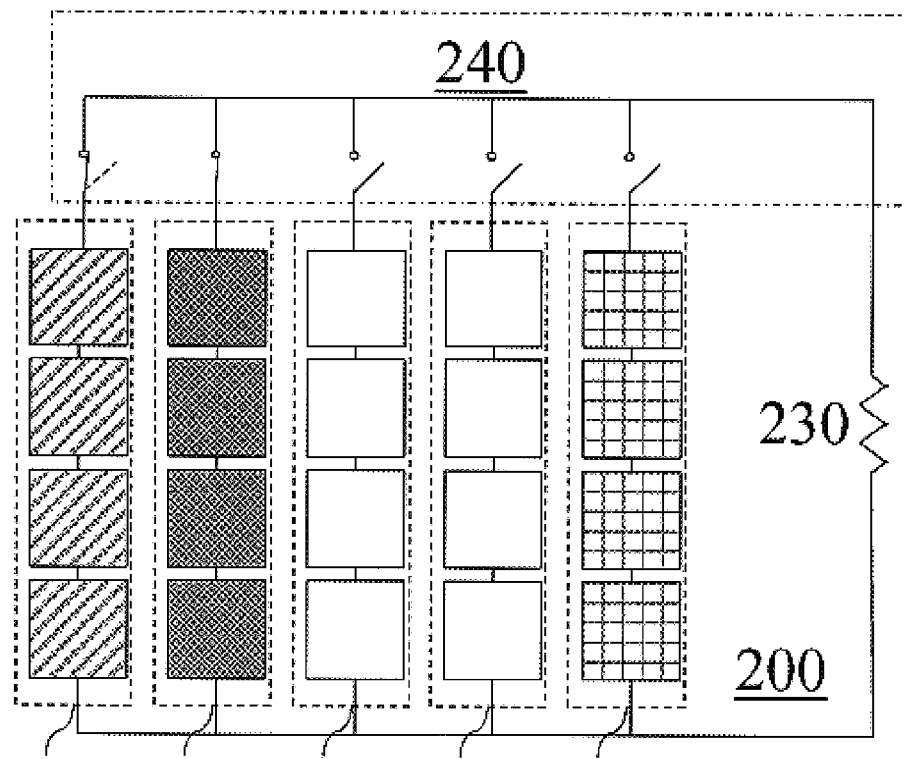
FIG. 2F depicts the system of FIG. 2A in a mode of operation showing one section of a first type of cells discharged and further utilizing another section of a first type of cells.

In the mode of operation depicted in FIG. 2F, the switch associated with string 212 is closed. In this embodiment, as depicted by the diagonal lines in the cells of string 210, string 210 is discharged or substantially discharged. Note that the switch associated with string 210 may be closed or open (as indicated with dashed lines). In certain circumstances, it may be desirable to maintain connection with string 210, for example, to withdraw any remaining power from the cells.

Figure 2G:
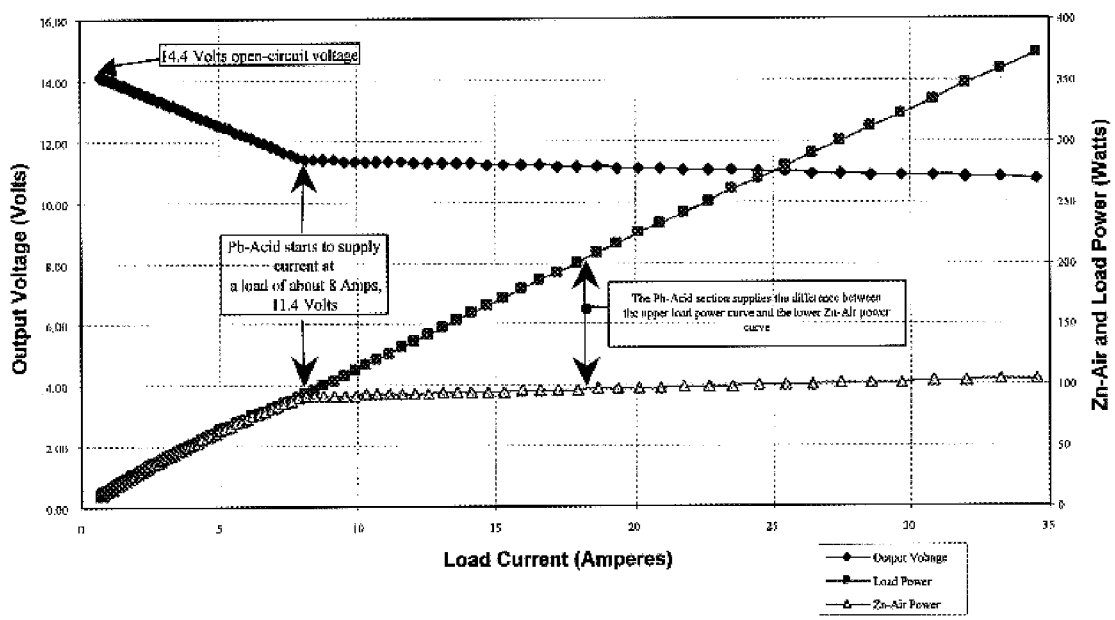
FIGS. 2G & 2H graphically depict the condition and associated operational variations of the a selectively activated electrochemical cell system and the system's response to a simulated load.
Figure 2H:
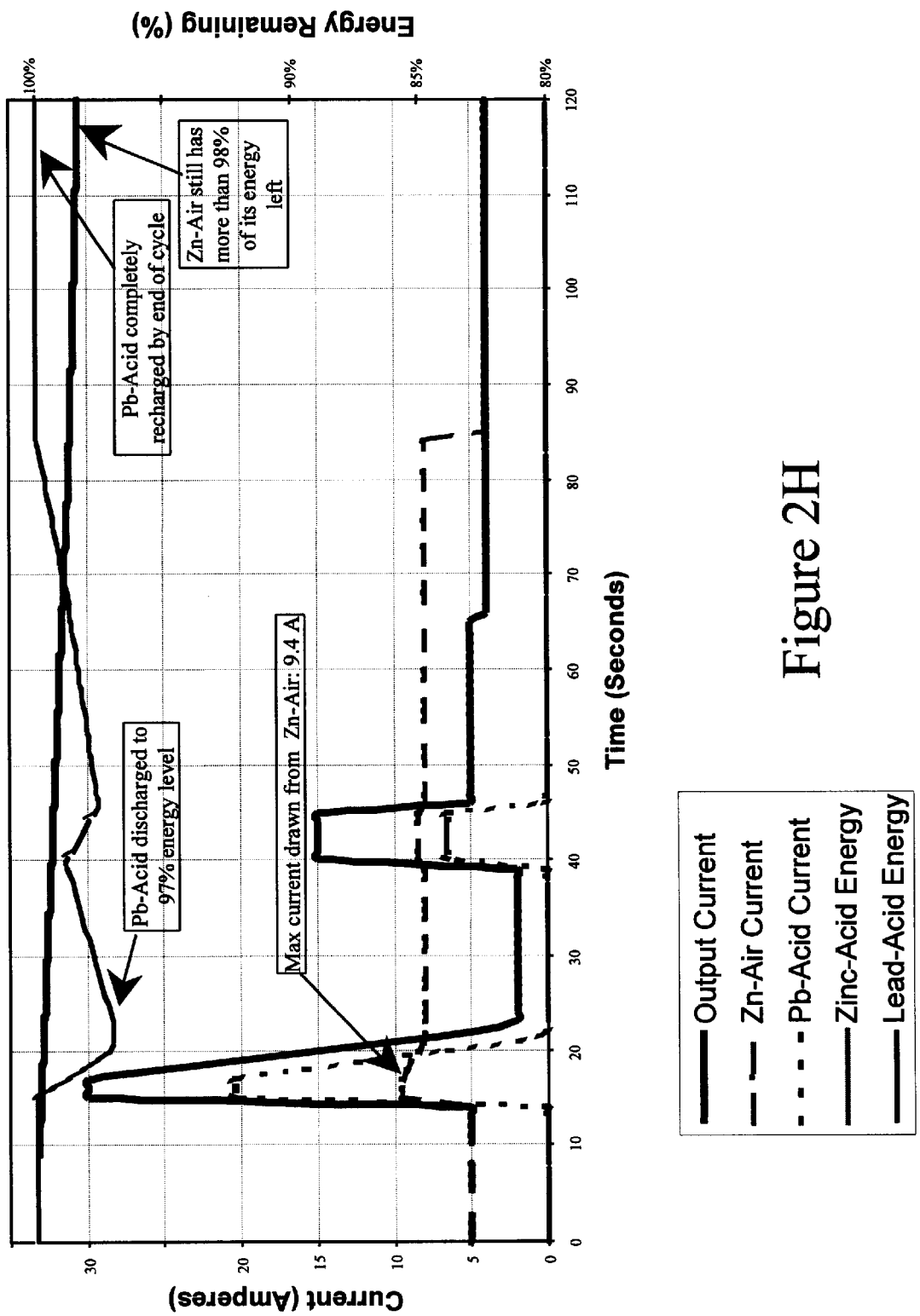

Graphical simulated operational analysis of a hybrid system similar to that depicted in FIG. 2A is provided in FIGS. 2G and 2H. In particular, the system is simulated based on a section of zinc-air batteries (Zn-air) and a section of lead acid (Pb—Ac) batteries. The section of Zn-air cells is characterized as two parallel strings of ten cells. Each cell has an open circuit voltage of 1.44 V, an internal resistance of 75 milliohms, a capacity of 15 W*h, and a depth of discharge of 50%. The Pb—Ac section is characterized by six Bolder Technologies 95 Sub C (Golden, Colo.) cells in series each having an open voltage of 2.00 V, 4.4 milliohms internal resistance, an energy capacity of 0.862 A*h per cell at 50 A, and a recharge efficiency of 55%. The Pb—Ac section engages at about 8 amperes of current draw, generally to supply the difference between the upper load demand and the Zn-air power output. The simulation is based on a theoretical, but quite plausible loading profile.

As shown in FIG. 2G, as the load current increases, the Zn-air section is unable to meet the demands, causing a voltage drop. To compensate, the Pb—Ac supplies additional power. As shown, this occurs when the load is about 8 amperes, corresponding to 11.4 volts. At this level, a diode associated with the Pb—Ac section becomes forward biased.

Referring to FIG. 2H, a simulated 120 second load condition is depicted. Note that while the load current is low (e.g., lower than about 5 A), the load is powered by the Zn-air section. However, as the load spikes to about 30 A, the draw on the Zn-air section increases (to a maximum of 9.4 A), while the draw on the Pb—Ac section increases from 0 A to over 20 A. As the load current decreases, the draw from the Pb—Ac section is halted, and accordingly, the Zn-air section powers the load. Further, the Zn-air section provides recharging power to the Pb—Ac section. A similar effect is shown with the load current spike to about 15 A. Note that the recharging allows the Pb—Ac section to be completely recharged at the end of the 120 second cycle.

Figure 3:
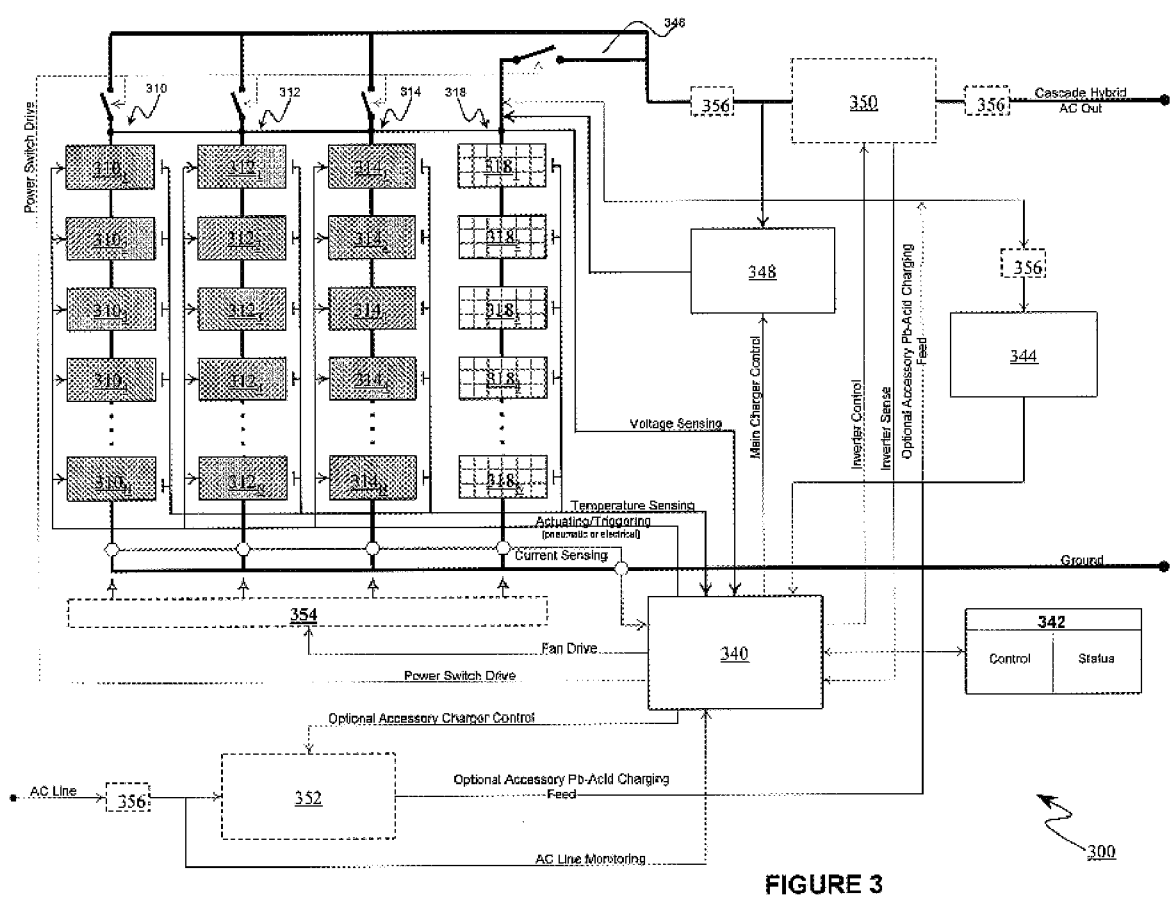
FIG. 3 is a schematic depiction of a selectively activated electrochemical cell system and associated subsystems.

Referring now to FIG. 3, a selectively activated electrochemical cell system 300 is depicted, including associated subsystems which may be present in a hybrid system for enhanced control and capability. The system 300 includes primary electrochemical cell sections 310 (cells $310_1$, $310_2$, $310_3$, $310_4$ ... $310_N$), 312 (cells $312_1$, $312_2$, $312_3$, $312_4$ ... $312_N$), and 314 (cells $314_1$, $314_2$, $314_3$, $314_4$ ... $314_N$), wherein the sections are in parallel; and a secondary electrochemical cell section 318 (cells $318_1$, $318_2$, $318_3$, $318_4$ ... $318_N$), which is in parallel with the primary cell sections 310, 312 and 314.

In general, the cell sections are controlled with a controller 340, which performs various functions and interacts with associated subsystems. For user interaction with the system 300, a user panel 342 is provided, including user control and status display. Sectional activation is provided with a power switch drive signal for controlling the switches associated with the sections. The AC line, e.g., which the system 300 backs up, is monitored by the controller 340. Current and voltage sensing systems are also provided, for example, to provide data for use by the controller 340. In systems where each cell undergoes a mechanical or electronic activation (i.e., as opposed to sectional activation), an actuation/triggering control signal may be provided. Also, in certain types of cell systems, temperature sensing is also provided, for example, whereby the controller 340 provides signals to optional fans 354 (as indicated by dashed lines) Note that while several types are displayed in FIG. 3, it will be apparent to those skilled in the art that certain functions are not required in certain types of cells or necessary systems, and further that additional functions may also be provided.

To provide for a hybrid system 300, wherein the secondary section 318 undertakes power provision during certain circumstances, a diode 346 is provided. The diode 346 only becomes forward biased when the current demand of the load is sufficient to cause a voltage drop within one of the selected strings 310, 312 and 314. With a sufficiently intelligent controller 340 combined with sufficient sensing elements the diode 346 can be eliminated (as well as its associated power losses) since the switch in series with string 318 can be controlled in a manor that replaces the function of the diode 346.

The system 300 further includes various associated subsystems. Power supplies 344 are included for providing suitable power for controller 340, and any included drivers, transducers, actuators, etc. A main charger 348 is also included, which provides suitable power conditioning (e.g., DC to DC) to allow charging of the secondary cell section 318 (e.g., a Pb-acid system) from the primary cell sections 310, 312 and 314 (e.g., Zn-air). Also, an optional DC-AC inverter 350 (indicated by dashed lines) may be provided, for example, to invert power from the electrochemical cell system 300 to a AC load or load system. Further, an optional accessory charger 352 is provided (indicated by dashed lines), e.g., which inverts an AC line to suitable DC power for charging the secondary cell section 318. Of course, plural optional circuit breakers 356 (indicated by dashed lines) may also be included, generally to protect the system circuitry and any connected loads.

The selectively activated electrochemical cell system provides many benefits in various applications. For example, emergency power systems may endure very long periods of non-operation without substantially diminishing power or capacity, even after they have been operated. Electric vehicles may be able to provide the necessary power for short term boosts, for example, with a rechargeable cell, while operating under "normal" conditions with a plurality of selectively activated primary cells, thereby facilitating long trips without manual refueling of the cells or recharging. Uninterruptible power supplies may include, for example, several arrays of typical primary or secondary batteries, such as "AA" size batteries. When one array is consumed, the controller switches to another array, whereby the user may replace the consumed array without power interruption.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An electrochemical power system for connection to a load comprising:
    a plurality of arrays of electrochemical cells in a parallel configuration, each array including a plurality of electrochemical cells arranged in series; and
    a controller system for controlling which one or more arrays of the plurality of arrays is to be in connection with the load upon demand of the load,
    wherein at least one of the arrays is prone to self discharge upon removal of the connection with the load, further wherein the at least one arrays prone to self discharge is allowed to self discharge after connection with a load if the load demand halts, and further wherein upon a reconnection with the load, the at least one array prone to self discharge is not selected by the controller, thereby maximizing capacity of the remaining array or arrays.

2. The system as in claim 1, wherein the controller system includes a switch associated with each of the arrays and a logic system.

3. An electrochemical cell system comprising:
    a plurality of sections of electrochemical cells, wherein individual sections are controlled for activation of one section or for activation in successions,
    wherein at least one of the arrays is prone to self discharge upon removal of the connection with the load, further wherein the at least one array prone to self discharge is allowed to self discharge after connection with a load if the load demand halts, and further wherein upon a reconnection with the load, the at least one array prone to self discharge is not selected by the controller, thereby maximizing capacity of the remaining array or arrays.

4. The electrochemical cell system as in claim 3, wherein at least one section comprises metal air electrochemical cells.

5. The electrochemical cell system as in claim 4, further wherein at least one section comprises secondary electrochemical cells.

6. The electrochemical cell system as in claim 5, wherein the secondary electrochemical cells have a higher power output and lower capacity than the metal air electrochemical cells, and further wherein activation control provided for activation of the metal air electrochemical cells at a load below a predetermined level value or range and activation of the secondary electrochemical cells at a load above a predetermined level value or range.

7. The electrochemical cell system as in claim 5, wherein upon activation of section of metal air electrochemical cells in response to a load current, the activated section discharges to a preselected depth of discharge or until completely discharged.

8. The electrochemical cell system as in claim 4, wherein the metal air electrochemical cells comprise reserve cells wherein cell components selected from the group of electrolyte, oxidant, anode, cathode, and any combination comprising at least one of the foregoing components are incorporated into the cells upon activation or at a controlled time prior to activation.

9. A method of generating power comprising:
    selectively activating a first group of one or more groups of electrochemical cells of an array of such groups of cells based on requirement of an associated load, wherein at least one of the groups is prone to self discharge upon removal of the connection with the load, further wherein the at least one group prone to self discharge is allowed to self discharge after connection with a load if the load demand halts; and
    switching to a second group of one or more electrochemical cells of the array when the first group is discharged, or removing the connection to the load if the load demand halts.

10. The method as in claim 9, further comprising switching to a third group of one or more electrochemical cells of the array when the second group is discharged.

11. The method as in claim 9, wherein the first group comprises rechargeable cells and the second group comprises primary cells.

* * * * *